(12) United States Patent
Hoffer, Jr.

(10) Patent No.: US 11,479,358 B2
(45) Date of Patent: Oct. 25, 2022

(54) AERIAL ROBOT POSITIONING SYSTEM UTILIZING A LIGHT BEAM MEASUREMENT DEVICE

(71) Applicant: John M. Hoffer, Jr., Columbia, MD (US)

(72) Inventor: John M. Hoffer, Jr., Columbia, MD (US)

(73) Assignee: TVS Holdings, LLC, Columbia, MD (US)

( * ) Notice: Subject to any disclaimer, the term of this patent is extended or adjusted under 35 U.S.C. 154(b) by 0 days.

(21) Appl. No.: 17/619,937

(22) PCT Filed: May 21, 2021

(86) PCT No.: PCT/US2021/033578
§ 371 (c)(1),
(2) Date: Dec. 16, 2021

(87) PCT Pub. No.: WO2021/237042
PCT Pub. Date: Nov. 25, 2021

(65) Prior Publication Data
US 2022/0204163 A1    Jun. 30, 2022

Related U.S. Application Data

(60) Provisional application No. 63/028,320, filed on May 21, 2020.

(51) Int. Cl.
*B64C 39/02* (2006.01)
*B64D 1/18* (2006.01)
(Continued)

(52) U.S. Cl.
CPC .............. *B64C 39/024* (2013.01); *B64D 1/18* (2013.01); *B64D 47/08* (2013.01); *G01S 17/66* (2013.01); *G05D 1/0094* (2013.01); *G05D 1/101* (2013.01)

(58) Field of Classification Search
CPC ........ B64C 39/024; B64D 1/18; B64D 47/08; G01S 17/66; G05D 1/0094; G05D 1/101
See application file for complete search history.

(56) References Cited

U.S. PATENT DOCUMENTS

2018/0120196 A1   5/2018  Georgeson et al.
2018/0361586 A1*  12/2018  Tan .......................... B61J 99/00
(Continued)

FOREIGN PATENT DOCUMENTS

WO          2019172253 A1    12/2019

*Primary Examiner* — Michael D Lang
(74) *Attorney, Agent, or Firm* — Invention To Patent Services; Alex Hobson

(57) ABSTRACT

A light-based measurement system is capable of directing a light beam to a cooperative target used in conjunction with an aerial robot to accurately control the position of the end effector within a large volume working environment defined by a single coordinate system. By measuring the end effector while the device is in operation, the aerial robot control system can be adjusted in real time to correct for errors that are introduced through the design of the robot itself providing accuracy in the tens or hundreds of micron range. A separate coordination computer runs control software that communicates with both the laser tracker and the aerial robot. An action plan file is loaded by the software that defines the coordinate system of the working volume, the locations where actions need to be performed by the aerial robot, and the actions to be taken.

30 Claims, 16 Drawing Sheets

(51) Int. Cl.
    *B64D 47/08*     (2006.01)
    *G01S 17/66*     (2006.01)
    *G05D 1/00*     (2006.01)
    *G05D 1/10*     (2006.01)

(56) References Cited

U.S. PATENT DOCUMENTS

| | | |
|---|---|---|
| 2019/0068953 A1 | 2/2019 | Choi et al. |
| 2019/0079522 A1 | 3/2019 | Grau |
| 2021/0070438 A1 | 3/2021 | Hoshide |

\* cited by examiner

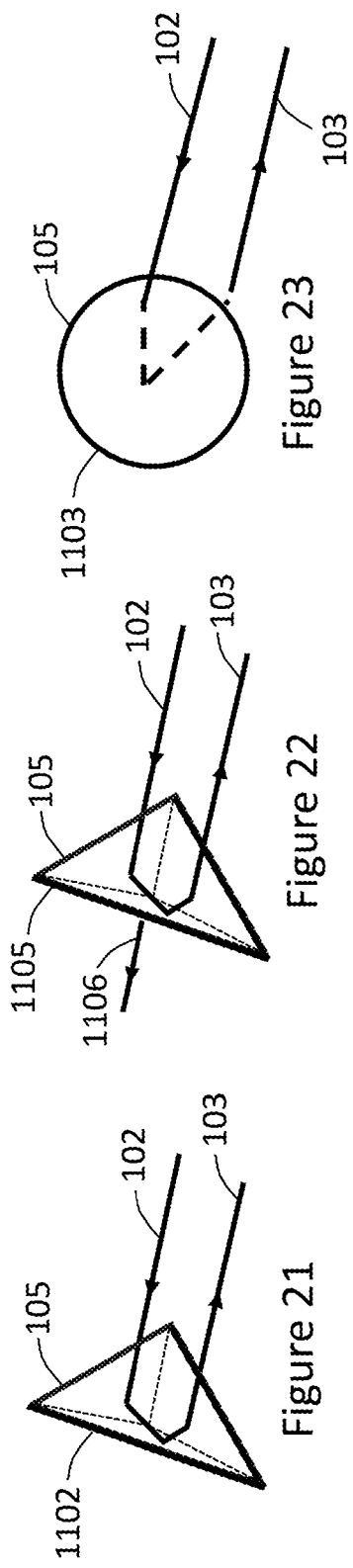
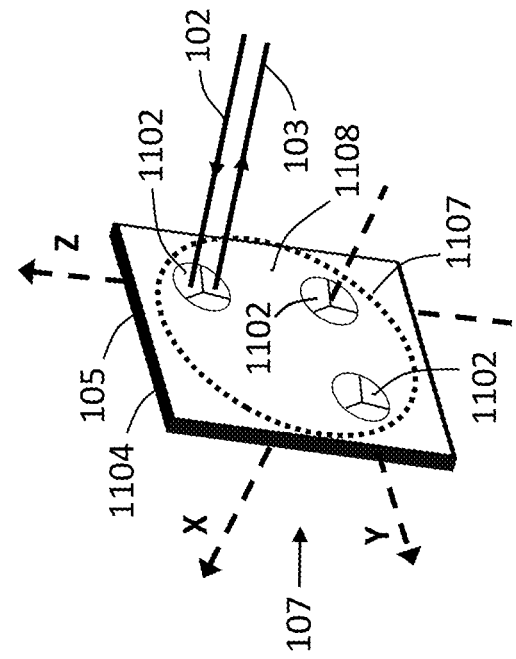
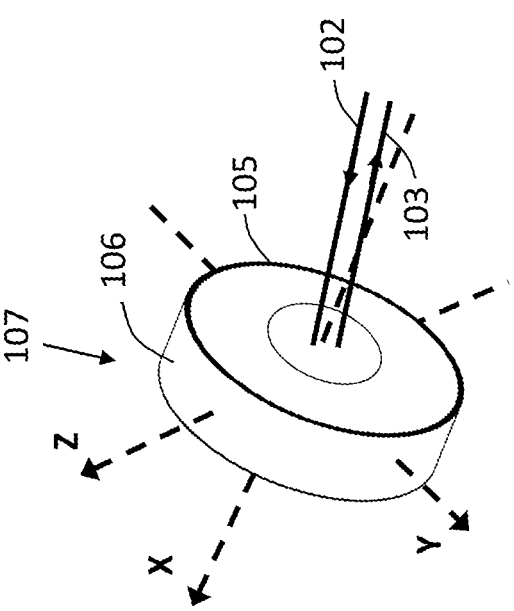

AERIAL ROBOT POSITIONING SYSTEM UTILIZING A LIGHT BEAM MEASUREMENT DEVICE

CROSS REFERENCE TO RELATED APPLICATIONS

This application claims the benefit of priority to U.S. provisional patent application No. 63/028,320, filed on May 21, 2020, the entirety of which is hereby incorporated by reference herein.

BACKGROUND OF THE INVENTION

Field of the Invention

The invention relates to precise position control of an aerial robot within a working volume using a light beam position measurement system utilizing a measurement source and a cooperative target that is capable of measuring in three or more degrees of freedom.

Background

Robots are used to carry out a variety of tasks that were previously performed by humans, and the variety of tasks they can perform is constantly growing. A robot as defined herein is any device capable of performing one or more tasks without the need of direct physical human intervention. These tasks require the robot to move in one or more degrees of freedom and an end effector, which is the device or tool connected to the robot capable of performing an action in the environment around the robot. Tasks for a robot include but are not limited to subtractive manufacturing, additive manufacturing, finishing, transportation, recording, and measurement.

Subtractive manufacturing can be defined as the task of removing material from a solid item such as a block or rod to create a desired shape. Exemplary materials are metal, wood, and plastic, and exemplary methods of removing material use end effectors capable of cutting, boring, drilling and grinding. An exemplary subtractive manufacturing robot is a CNC machine.

Additive manufacturing may be defined as the task of adding material to create a shape. A robot capable of moving in multiple degrees of freedom has a nozzle end effector to deposit layers of materials in specific locations that harden to form the desired shape. Exemplary materials for additive manufacturing are metal, plastic, and concrete. This process is often referred to as three-dimensional (3D) printing.

Finishing can be defined as a task of altering the surface of an items to achieve a particular characteristic. An exemplary action would be spray painting, where an end effector nozzle directs paint to a surface. Another exemplary action is cleaning where either an end effector nozzle directs a cleaning solution toward a surface or the end effector is an absorbent material that comes into contact with the surface to remove dirt or debris. Another exemplary action is leveling, where the end-effector is a straight edge that is pulled across a fluid material such as freshly poured concrete to even it. Another exemplary action is smoothing where the end effector is an abrasive material brought into contact with a surface to remove rough spots.

Transportation can be defined as moving an item from one location to another. An exemplary end effector would be a gripper that is capable of grasping an object in a way similar to the human hand, moving it to another location and then releasing its grasp.

Recording can be defined as storing images or sounds for the purposes of viewing or listening to the stored items either in an alternate location or at a future time. An example of this would be a video camera mounted to an automated stage capable of moving around an object being recorded.

Measurement can be defined as using one or more sensors to collect data, such as numeric data, related to a property of an object. Exemplary properties include size, shape, weight, and volume. An exemplary end effector would be a probe tip that physically comes in contact with one or more locations of an object to determine its size and shape. An exemplary robot performing this action would be a coordinate measurement machine. An exemplary end-effector would be a laser scanner, which can be attached to a jointed arm that is capable of moving around an object to determine its size and shape.

For many of these tasks, the working volume is limited by the size of the robot. As the size of the robot is increased, the complexity of the structure required to maintain stability and accuracy increases. This is due to the fact that position measurement in robots rely on individual measurements of each degree of freedom which are then projected to the location of the end effector. If the structure is not stiff enough such that the end effector is capable of moving without being measured by the robot sensors, there is a loss of accuracy in position of the end effector. For applications where the robot must be moved to the locations where tasks are to be performed, this increased structure to create stiffness makes the robot increasingly difficult to transport.

There are examples today of large additive manufacturing robots for printing concrete structures. Scaling these robots up to build larger structures will remain a challenge for transport, setup, and accuracy.

Aerial robots, sometimes referred to as unmanned aerial vehicles (UAVs), drones or quadcopters, offer a solution to the need for additional structure as volume increases. Since an aerial robot is capable of moving in multiple degrees of freedom without the need for surrounding structure, its working volume is more easily increased. The most common action of aerial robots at this time is recording video or still images where the end effector is a camera capable of live streaming or recording images at a significant distance from the operator. There are implementations where the aerial robot is digitally tethered to a person, so it is capable of following someone and capturing images in the process. There are already commercially available aerial robots that are capable of cleaning widows and navigating warehouses to transport material to various locations.

U.S. Pat. No. 7,510,142 Aerial Robot, Johnson, discloses an example of an aerial robot with multiple propellers. Included in the claims is an observation device, which in further dependent claims is defined as a camera, sensor, and a microphone which may be considered end-effector since these devices interact with the environment, which in this case is to record what it sees and hears. The patent also discloses a holder such as a box, arm, or other attached delivery device, which can also be called an end effector in that it grasps objects for the purpose of delivering them. The patent further discloses a flight control system comprised of an optical digital signal processor that can be used to maintain the robot position to a referenced ground object. The patent further discloses the use of altimeters, GPS, X, Y, Z accelerometers, and gyros as other methods for controlling position. All of these methods are limited in their precision in positioning the aerial robot.

European Patent EP3140192A2 discloses an aerial robot with an object-retaining means for holding an object to be affixed to a target site; and a dispensing assembly for dispensing an adhesive. The means for holding an object and the dispensing assembly may be considered an end effector. The patent further discloses the use of sensors for generating data regarding the surrounding environment that includes cameras, lasers, and sonar that are meant as a means to navigate the surrounding environment. However, these do not provide a means to provide location with respects to a defined coordinate system.

U.S. Pat. No. 9,367,067 Digital Tethering for Tracking with Autonomous Aerial Robot. Gilmore et al. discloses the concept of tethering an aerial robot to a target such as a person. As the target moves, the aerial robot tracks it. The position system does not address precise measurements in a defined coordinate system.

With all of the demonstrated uses, GPS, accelerometers, gyros, and cameras are used to position the aerial robot, which lack the precision necessary to perform high accuracy motion.

Light beam measurement devices such as laser trackers offer a solution to this problem since they are capable of directing a light beam capable of precisely measuring objects in three or more degrees of freedom over large volumes.

An example of one of these systems for performing 3-D measurements is defined in U.S. Pat. No. 4,790,651 Tracking Laser Interferometer, Brown et al. This device follows a reflective target using an interferometer to provide the distance to the target and angular encoders in combination with a position-sensing device to provide the transverse measurements. In this system, rotation of the target about the axes of the coordinate system is not available. Often, the reflector is mounted in a sphere that has a known radius from the center of the target to the surface of the sphere such that the target measurements can be projected to the location where the surface of the sphere touches the object being measured.

An alternate method of measuring more degrees of freedom is disclosed in U.S. Pat. No. 4,714,339 Three and Five Axis Laser Tracking Systems, Lau et al. Described is a target with a beam splitter and a position-sensing device, which can provide two rotation angles and two linear displacements. The shortcoming of this invention is the field of view for determining the pitch and yaw angles is limited to the field of view of the position sensing device. In addition, there is no measurement of rotation about the axis of the beam.

U.S. Pat. No. 7,701,559 Absolute Distance Meter that Measures a Moving Retroreflector, Bridges, et al. discloses a laser tracker that uses a method of modulating laser intensity to measure the distance to a target while compensating for motion.

U.S. Pat. No. 8,803,055 Volumetric Error Compensation System with Laser Tracker and Active Target, Lau et al. discloses the concept of an active target, which keeps the reflective target pointed back toward the laser tracker while performing compensation on a machine tool. Disclosed is the concept of using the active target to measure machine tool positions to determine positional errors and developing a compensation model, which is not using the data in real-time. Also disclosed is the concept of using the active target in real-time to augment the machine control with a higher accuracy position measurement system. However, this solution requires a robot position system to position the end effector and once motion is complete to augment the motion to further correct the position.

U.S. Pat. No. 8,525,983 Device and Method for Measuring Six Degrees of Freedom, Bridges et al. and U.S. Pat. No. 8,670,114 Device and Method for Measuring Six Degrees of Freedom, Bridges et al. define other methods for measuring six degrees of freedom with a laser tracker.

U.S. Pat. No. 9,976,947 Position Measurement Device, Hoffer discloses a method for performing a multiple degrees of freedom measurements using a combination of moving optics and the polarization property of light. Some of the devices disclosed are light receivers that perform measurements directly without reflecting light back to the measurement source.

The purpose of these measurement devices is to measure either object or locations, but these devices can also be used as a position feedback in a motion control system. The large working volume of an aerial robot combined with the large measurement volume these measurement devices allows for the creation of a motion control system that works over large volumes and opens several new applications.

U.S. Pat. No. 9,958,268 Three-Dimensional Measuring Method and Surveying System, Ohtomo et al., discloses the use a total station, which is another type laser-based measurement device, combined with an image capture device mounted to a flyting vehicle, which can be considered an aerial robot with a camera as the end effector. The disclosed invention indicates that the aerial robot is remotely controlled and the total station measures the position. The invention relies on gyros, compasses, and accelerometers to detect the attitude of the device and maintain the orientation of the target with respect to the measurement device. The position of the aerial robot is measured in order to combine the position data with the images that are captured, but it is clear that the total station data itself is not used to control the position of the flying vehicle.

Japanese Pat. No. JP67844342 Methods, UAV Control Programs, Unmanned Aerial Vehicle Control Systems and U.S. Pat. No. 9,164,506 Systems and Methods for Target Tracking, Zang discloses use of a camera and targets to control position, which will lack the precision of the light beam measurement devices.

SUMMARY OF THE INVENTION

The invention is directed to a light-based measurement system capable of directing a light beam to a cooperative target used in conjunction to control the position of an aerial robot such that an end effector, coupled to the aerial robot, can be accurately placed within a large volume working environment defined by a single coordinate system.

An exemplary embodiment of the aerial robot system has a laser tracker mounted at a fixed location and an aerial robot, such as a quadcopter, with an end effector where a cooperative target is mounted to the quadcopter in a fixed relationship to the end effector. The cooperative target may be a single retroflector. A separate coordination computer runs control software that communicates with both the laser tracker and the quadcopter. An action plan file may be loaded by the software that defines the coordinate system of the working volume, the locations where actions need to be performed by the aerial robot, and the actions to be taken. The control software first establishes a relationship between the device coordinate system of the laser tracker and the working volume by measuring three points in the working coordinate system of the working volume. The first point is the origin. The second point is on a line that defines the positive X-axis. The third point is off of the X-axis in the direction of the positive Y-axis that defines the XY-plane. From these measurements, a transformation matrix can be calculated to convert between locations in the working coordinate system and the laser tracker device coordinate system.

The control software then commands the laser tracker to point the laser to the target on the quadcopter and begins measuring a position while executing the steps defined in the control data file where each step defines a location for the end effector and an action to be performed. For each step location, the control software sets the command position for a control loop that will continuously calculate then necessary outputs to be sent to the quadcopter so that it moves to the desired location. Once the quadcopter has reached the desired location, the control software will hold the quadcopter in that position and send a command for the end effector to perform its function. When that function is complete, control software will execute the next step from the action plan file until all steps are completed.

An exemplary embodiment of the aerial robot system, the light beam measurement device may not have a beam steering assembly so the measurement beam is in a fixed orientation and it has the capability to measure the distance to the cooperative target and horizontal and vertical offsets of the target from the center of the beam, so while it is a three-dimensional measurement, it has a limited field of view. The light beam measurement device is mounted so that its emitted light beam defines the X-axis of the coordinate system. The coordination software guides the user to place a retro reflector in the beam path such that the target is offset from the beam in the Y-axis of the working coordinate system. From these measurements, a transformation matrix can be calculated to convert between locations in the working coordinate system and the measurement device coordinate system and the control software can begin executing the action plan file.

An exemplary embodiment of the of the aerial robot system has a laser tracker mounted to the aerial robot in a known, and/or fixed relationship to the end effector and a cooperative target is mounted in a known and fixed location within the working coordinate system so that no measurements are required to establish the coordinate system.

An exemplary embodiment of the aerial robot system combines the light beam measurement device and the coordination computer in a single unit so that no external computer is required to perform coordination functions.

An exemplary embodiment of a cooperative target is an assembly made of three retroreflectors mounted in a known orientation to each other. The light beam measurement device repeatedly measures each of these retroreflectors in sequence at a rate sufficiently high enough to ensure the aerial robot stays within its line of site. Measurement of the three individual retroreflectors is combined by the measurement device to produce a single six-degree-of-freedom location measurement. This information allows the coordination computer to both position the aerial robot within the working coordinate system and maintain an orientation where the target is always pointing towards the measurement device.

An exemplary embodiment of a cooperative target is a light receiver capable of both reflecting a portion of light back to the light beam measurement device and measuring two rotation angles about the emitted measurement beam. The light beam measurement device can combine its 3D measurement of the target location with the two rotation angles to produce a five-dimensional (5D) measurement the coordination computer can use to both position the aerial robot within the working coordinate system and maintain an orientation where the target is always pointing towards the measurement device.

An exemplary embodiment of the aerial robot system has an aerial robot capable of carrying printable concrete with an end effector that is a nozzle to disperse the concrete. The action plan file may be a CAD drawing of the structure to be built. The coordination computer commands the aerial robot to move along a defined path and open the nozzle by the appropriate amount to distribute the concrete at the necessary rate.

An exemplary embodiment of the aerial robot system has an aerial robot capable of carrying paint with an end effector that is a spray nozzle. The action plan is a two-dimensional (2D) drawing of lines to be painted on a parking lot. The coordination computer commands the aerial robot to move along a defined path and spray paint at the appropriate locations.

An exemplary end effector includes an actuator, such as a gripper. The aerial robot can be commanded to pick up objects such as bricks and transport them to a location with precise placement to build a brick wall.

An exemplary end effector is a non-contact measurement device known as a displacement sensor as an end effector. The coordination computer commands the aerial robot to pass over a surface to be measured. The location data of the aerial robot combined with the data from the non-contact measurement device can be combined to create a complete measurement of the surface.

An exemplary end effector is a screed tool, where the aerial robot can be directed to move the screed tool across poured concrete to smooth it.

An exemplary end effector is a tamper, where the aerial robot can be directed to specific locations and then directed to move up and down to compact material such as sand.

An exemplary aerial robot has for propeller mounted approximately in a rectangle where the propellers across from each other rotate in one direction and the remaining two rotate in the opposite direction. The pitch of the propellers is such that when all four are rotating at approximately the same speed, the aerial robot will gain altitude. Changing the speed of two diagonal propellers with respect to the remaining propellers will create a yaw motion. Changing the speed of two adjacent propellers with respect to the remaining two propellers will cause the aerial robot to roll or pitch and can be used to move it from side to side or front to back.

An exemplary light beam measurement device is a laser tracker.

An exemplary light beam measurement device is a total station.

An exemplary coordination processor is a computer, such as a laptop computer, that is able to wirelessly communicate with both the aerial robot and the light beam measurement device.

An exemplary aerial robot incorporates a motion system capable of moving the position of the end effector in multiple directions independently of the aerial robot. The cooperative target is mounted in a fixed relationship to the end effector. An exemplary end effector position mechanism is capable of high-speed movements allowing the position of the end effector to be adjusted quickly to maintain accurate placement under conditions where environmental conditions such as wind are pushing the aerial robot. The aerial robot can make lower speed corrections to its position allowing the end effector motion system to return to the center of its operating range. An exemplary end effector position mechanism may have rotational and/or translational motion capability and may have an arm or plurality of arms that enable one or more degrees of freedom. As an example, an end effector position mechanism comprises two arms that are pivotably connected to enable extension from the aerial robot and the connected arm may be configured on a rotational mount coupled with the aerial robot.

An exemplary aerial robot system has two or more aerial robots and a laser tracker capable of quickly redirecting its emitted laser beam at a high rate to that it can measure the two separate locations. The coordination controller maintains the position of each aerial robot independently and coordinates the actions they perform.

An exemplary aerial robot system has multiple laser trackers and a single aerial robot. The coordination controller maintains the position of the aerial robot by determining first which laser tracker has the aerial robot in its field of view and then commanding that device to track and measure its position.

An exemplary light beam measurement device has an imaging camera capable of identifying cooperative targets over a large field of view and then using the beam steering assembly to direct the emitted measurement beam to the target, which simplifies the target acquisition process for the operator.

Definitions

Action plan as used herein is any digital representation of data that describes locations and actions to be performed with an end effector.

Aerial robot as used herein is any autonomous or semi-autonomous heavier than air device capable of aerial motion with at least three degrees of freedom and capable of performing one or more functions with an end effector; an aerial robot may be positioned within aerial space with propellers. An exemplary aerial robot is physically untethered and has a position driver that moves it freely through airspace.

Position driver as used herein includes a device that is configured to move the aerial robot within three-dimensional space and may comprise one or more propellers and associated directional device.

Contact measurement device as used herein is any measurement device that must come in contact with the surface to be measured, and includes, but is not limited to, probe tips and spherically mounted retroreflectors.

Cooperative target as used herein is any target capable of working in conjunction with a measurement device to produce positional measurement of three or more degrees of freedom. Such targets include but are not limited to reflective targets and light receivers.

End effector as used herein is any device that is coupled to a robot and capable of interacting with the surrounding environment and includes, but is not limited to, camera, microphone, position or measurement probe, implement including, paint applicator, wrench, screwdriver and the like.

Light beam measurement device as used herein is any device capable of projecting a collimated beam of light to determine the position of a target in three-dimensional space.

Laser tracking devices as used herein are a subset of light beam measurement devices that have the ability to steer the measurement beam, which is a laser, in at least two directions enabling it to keep the beam centered on the target, and includes, but is not limited to, laser trackers and total stations.

Light receiver as used herein is a cooperative target capable of performing a positional measurement of its location with respect to a light beam without necessarily reflecting a portion of a light beam back to the light source. These types of cooperative targets may also reflect a beam back to the measurement source so that data from both the measurement source and the target can be combined to form a single position measurement.

Non-contact measurement device is any device capable of measuring a distance to a surface or a surface thickness. This includes but is not limited to displacement sensors, laser scanners, or other devices using LIDAR.

Paint as used herein is any pigmented liquid or powder that converts to a solid film after application.

Printable materials as uses herein is any material that can be delivered through a nozzle and then hardens. Such materials include but are not limited to molten plastic, liquid resins, powders such as nylon on polyamide, concrete, cementitious grout, mortar, caulk, adhesive, metal powder, or graphite.

Reflective target as used herein is a cooperative target capable of reflecting light back toward a light source so that the target position can be measured. A reflective target includes but is not limited to mirrors, retro reflectors, retro spheres.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

FIG. 21 is a perspective view of an exemplary retro reflector.

FIG. 22 is a perspective view of an exemplary partially transmissive retro reflector.

FIG. 23 is a perspective view of an exemplary retro sphere.

FIG. 24 is a perspective view of an exemplary light receiving target.

FIG. 25 is a perspective view of an exemplary retro reflector assembly.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
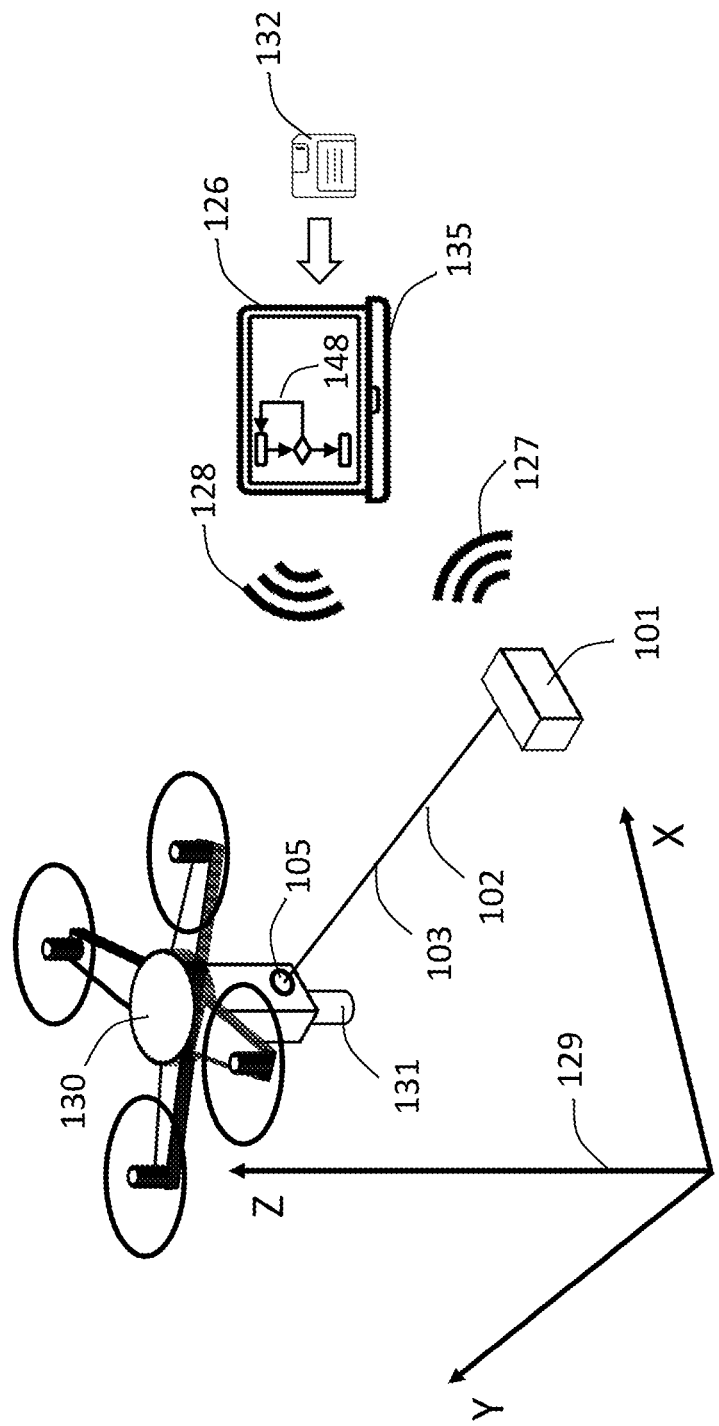
FIG. 1 is a perspective view of an exemplary aerial robot system where the coordination processor is a separate device.

FIG. 1 is an exemplary aerial robot system with an aerial robot 130 with end effector 131 coupled with a cooperative target 105. A measurement source 101 transmits an emitted measurement beam 102 for which of portion is reflected back by said cooperative target as a reflected measurement beam 103. Said measurement source produces target data 127 that is transmitted to a coordination processor 126, which is a computer 135, such as a laptop computer, running a control algorithm 148. Said computer processes an action plan 132 and sends an action output 128 to said aerial robot to position it and perform actions in the working volume defined by a working coordinate system 129. Beam steering is accomplished by a moveable mirror that can reflect the beam in two angles.

Figure 2:
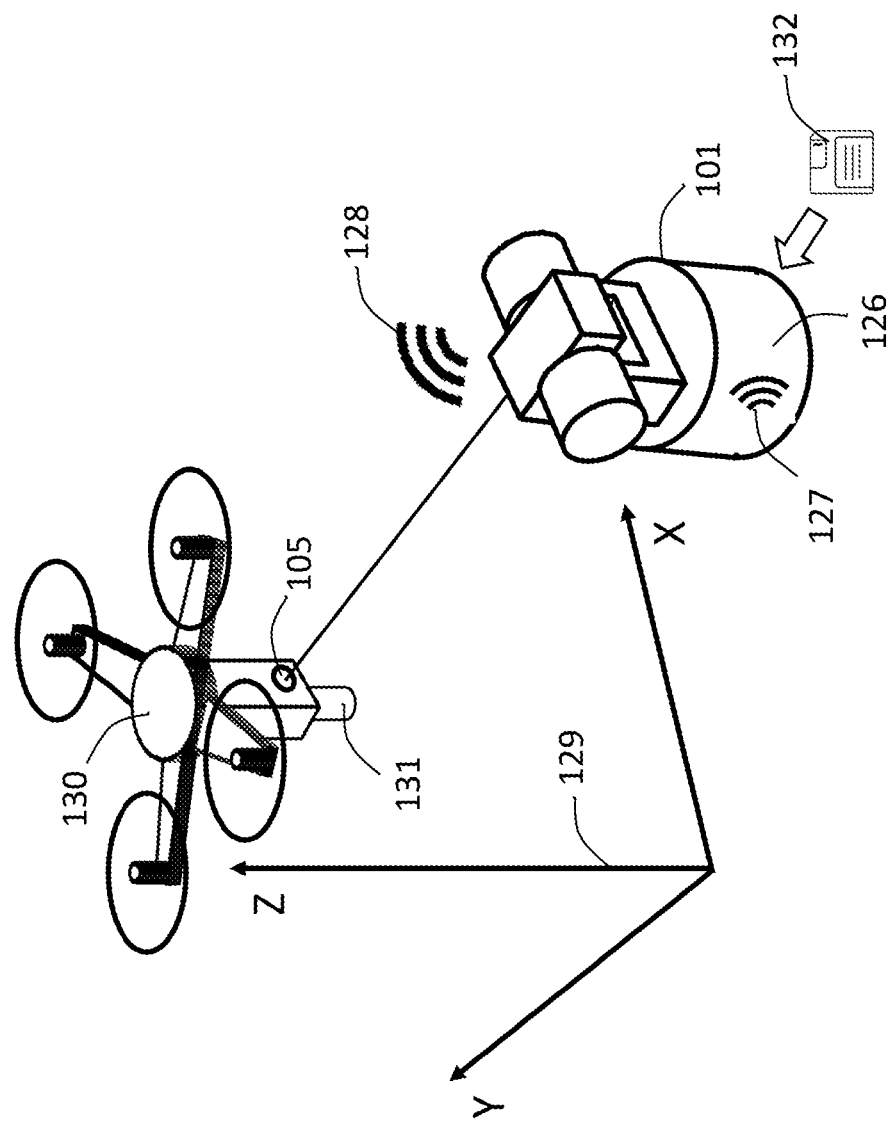
FIG. 2 is a perspective view of an exemplary aerial robot system where the coordination processor is integrated with the source measurement device.

FIG. 2 is an exemplary measurement source 101 that has an integrated coordination processor 126 so that a separate external computer is not required. Beam steering is accomplished by a two-axis gimbal that steers the entire optical assembly.

Figure 3:
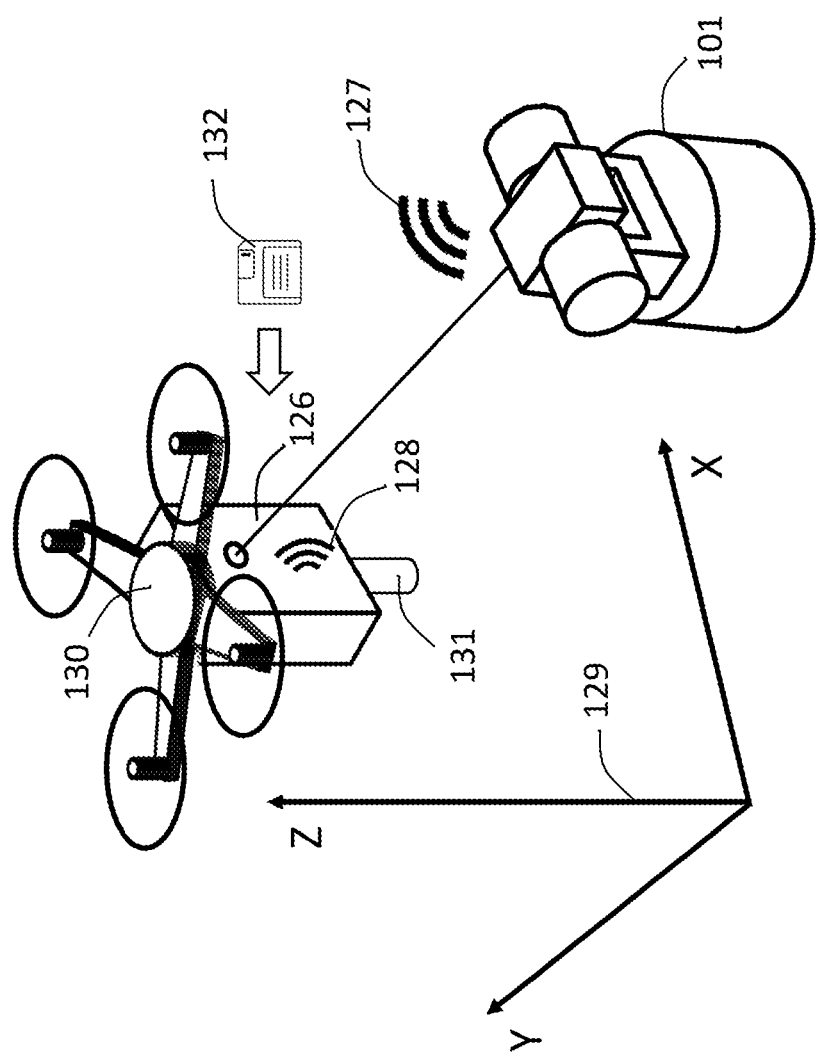
FIG. 3 is a perspective view of an exemplary aerial robot system where the coordination processor is integrated with the aerial robot.

FIG. 3 is an exemplary aerial robot 130 that has an integrated coordination processor 126 so that a separate external computer is not required.

Figure 4:
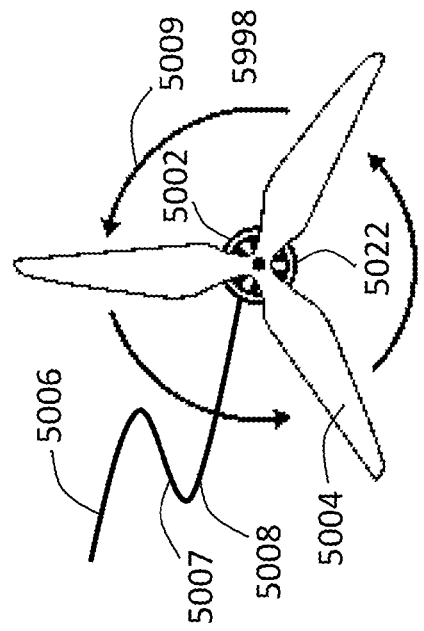
FIG. 4 is a perspective view of an exemplary aerial robot mechanical assembly.

FIG. 4 is an exemplary aerial robot mechanical assembly 5001 in a quadcopter configuration that has two motors 5002, 5002' rotating in a first direction, two motors 5003, 5003' rotating in a second direction, and an end effector 131 mounted to an aerial robot mounting structure 5021.

Figure 5:
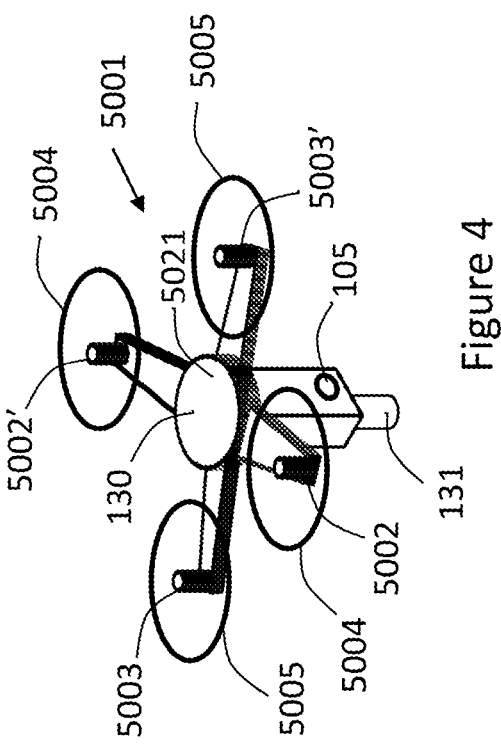
FIG. 5 is a top view of an exemplary motor configuration.

FIG. 5 shows an exemplary position driver 5023. If the speed of the two motors 5002, 5002' rotating in a first direction is different than the speed of two motors 5003, 5003' rotating in a second direction, the aerial robot will move in a yaw direction 5020. If the speed of left pair of motors 50 14, 5014' is different than right pair of motors 5015, 5015', the aerial robot will roll and cause a side-to-side motion 5018 of the aerial robot. If the speed of the front pair of motors 5016, 5016' is different than the back pair of motors 5017, 5017' the aerial robot will pitch and cause a forward-reverse motion 5019 of the aerial robot.

Figure 6:
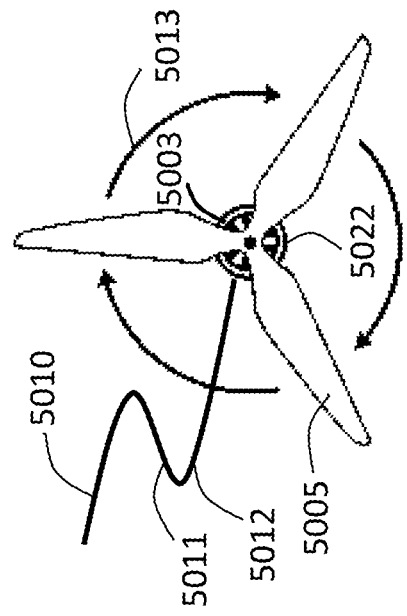
FIG. 6 is a top view of an exemplary motor rotating counter-clockwise.

FIG. 6 shows one or more motors coupled with propellers 5022, which is a motor 5002 rotating in a first direction with a first propeller 5004 such then when rotating counter-clockwise 5009 from the top view will create lift. A first motor cable 5008 carrying one or more voltages and current represent a first motor signal output 5006 connected to a first motor signal input 5007 that controls the speed of rotation.

Figure 7:
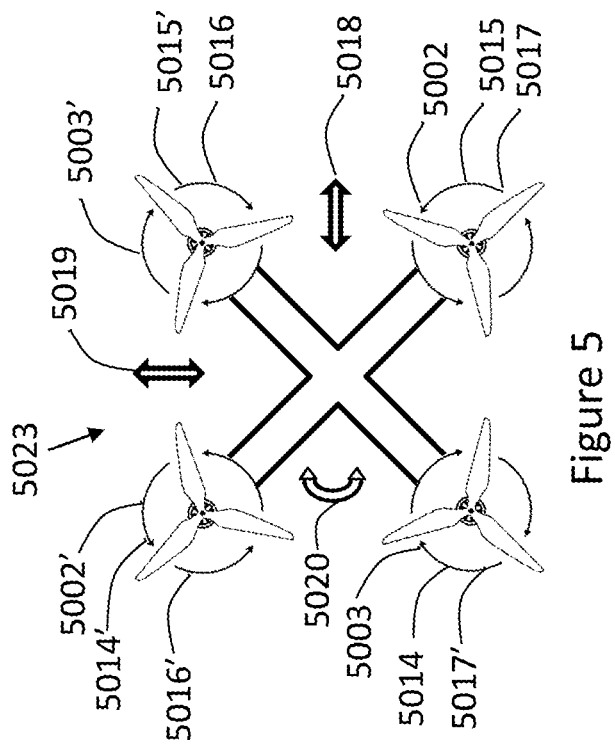
FIG. 7 is a top view of an exemplary motor rotating clockwise.

FIG. 7 shows an exemplary motor 5003 rotating in a second direction 5013 with a second propeller 5005 such then when rotation in a clockwise direction 5013 will create lift. A second motor cable 5012 carrying one or more voltages and current represent a second motor signal output 5010 connected to a second motor signal input 5012 that controls the speed of rotation.

Figure 9:
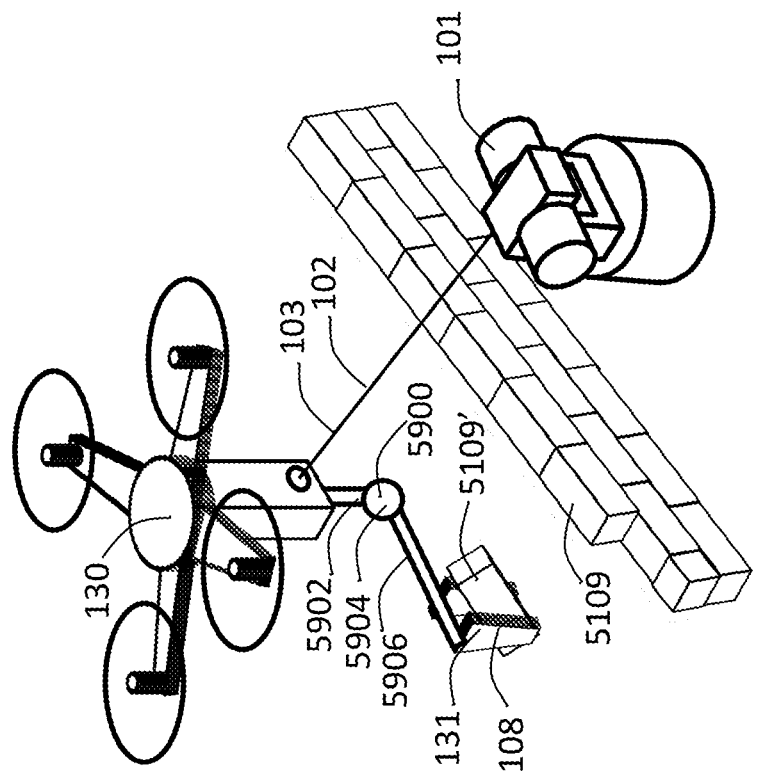
FIG. 9 is a perspective view of an exemplary gripper.
Figure 8:
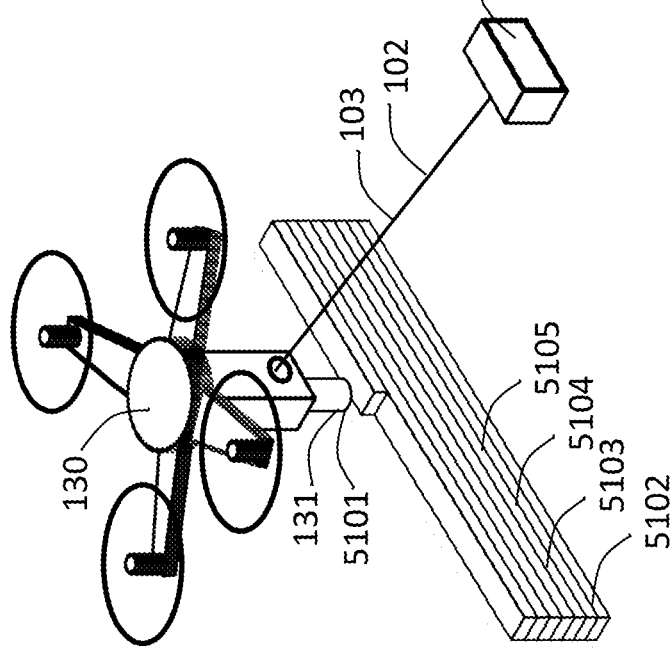
FIG. 8 is a perspective view of an exemplary nozzle distributing printable material.

FIG. 8 shows an exemplary aerial robot 130 with an end effector 131, which is a nozzle 5101 capable of dispensing a printable material 5102 that hardens into a material such as hardened plastic 5103, hardened concrete 5104, or hardened metal 5105, FIG. 9 is an exemplary gripper 5108 capable of picking up and placing and exemplary object such as a brick 5109. The exemplary gripper 5108 is an actuator type end effector having at least one of the gripper arms that actuates toward the other gripper arm. The gripper 5109 is holding a brick 5109', picked up from the stack of bricks. The exemplary gripper is coupled to an end effector position mechanism 5900 that extends from the aerial robot 130 to the end effector 131, the gripper 5108 actuator. The exemplary end effector position mechanism 5900 has a coupled arm 5902 that is coupled with or attached to the aerial robot 130 and an extended arm 5906 that has the end effector 131 coupled or attached thereto. The extended arm is coupled to the coupled arm by an end effector position mechanism actuator 5904, such as a pivoting and/or rotating joint or coupling between the coupled arm and the extended arm. As shown, the end effector position mechanism actuator 5904 enables pivoting between the coupled arm and the extended arm. The coupled arm may have a rotational engagement or coupling with the aerial robot to provide an additional degree of freedom of rotation. An end effector position mechanism actuator may provide translational motion, rotational motion, and/or pivoting motion between a coupled arm and an extended arm of the end effector position mechanism. Also, any number of end effector position mechanism arms may be configured between a coupled arm and an extended arm to provide additional degrees of freedom.

Figure 10:
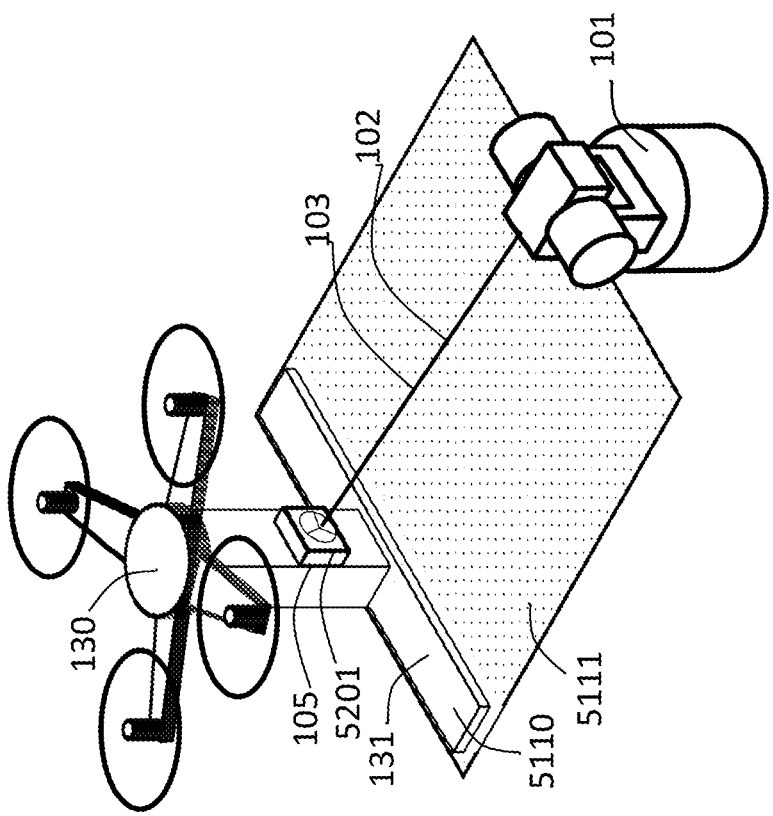
FIG. 10 is a perspective view of an exemplary screed tool used in conjunction with a light receiving target.

FIG. 10 shows an exemplary screed tool 5110 that is pulled across poured concrete 5111 to level it. In this application, it is important to control yaw, so the cooperative target 105, is a light receiving target 5201 capable of measuring yaw.

Figure 11:
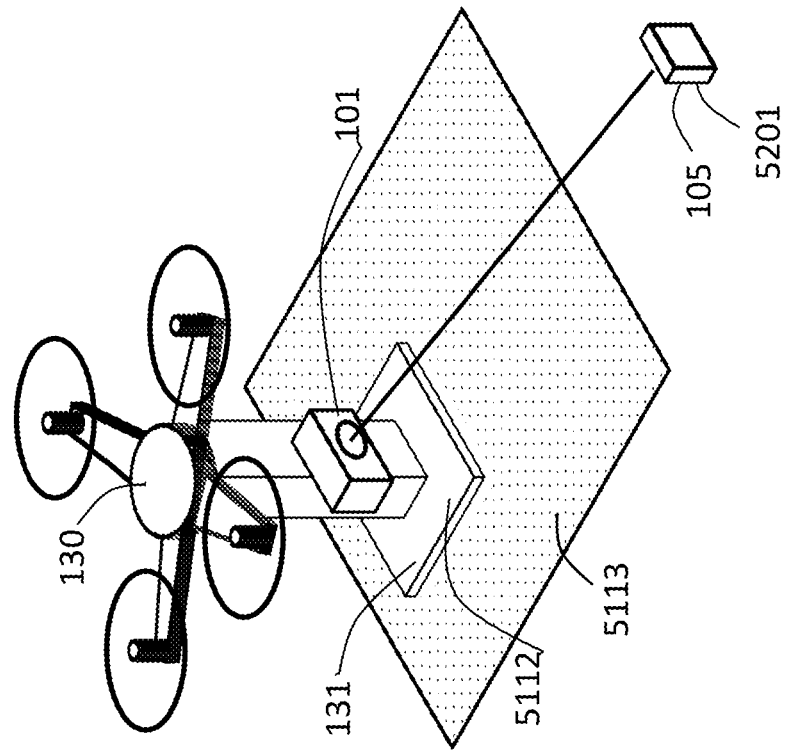
FIG. 11 is a perspective view of an exemplary tamper with the measurement source mounted to aerial robot.

FIG. 11 shows an exemplary tamper 5112 used to compact a construction material such as sand 5113. Measurement source 101 is mounted to aerial robot 130 in a known and fixed relationship to the end effector 131 and points to a cooperative target 105 mounted in a fixed location.

Figure 12:
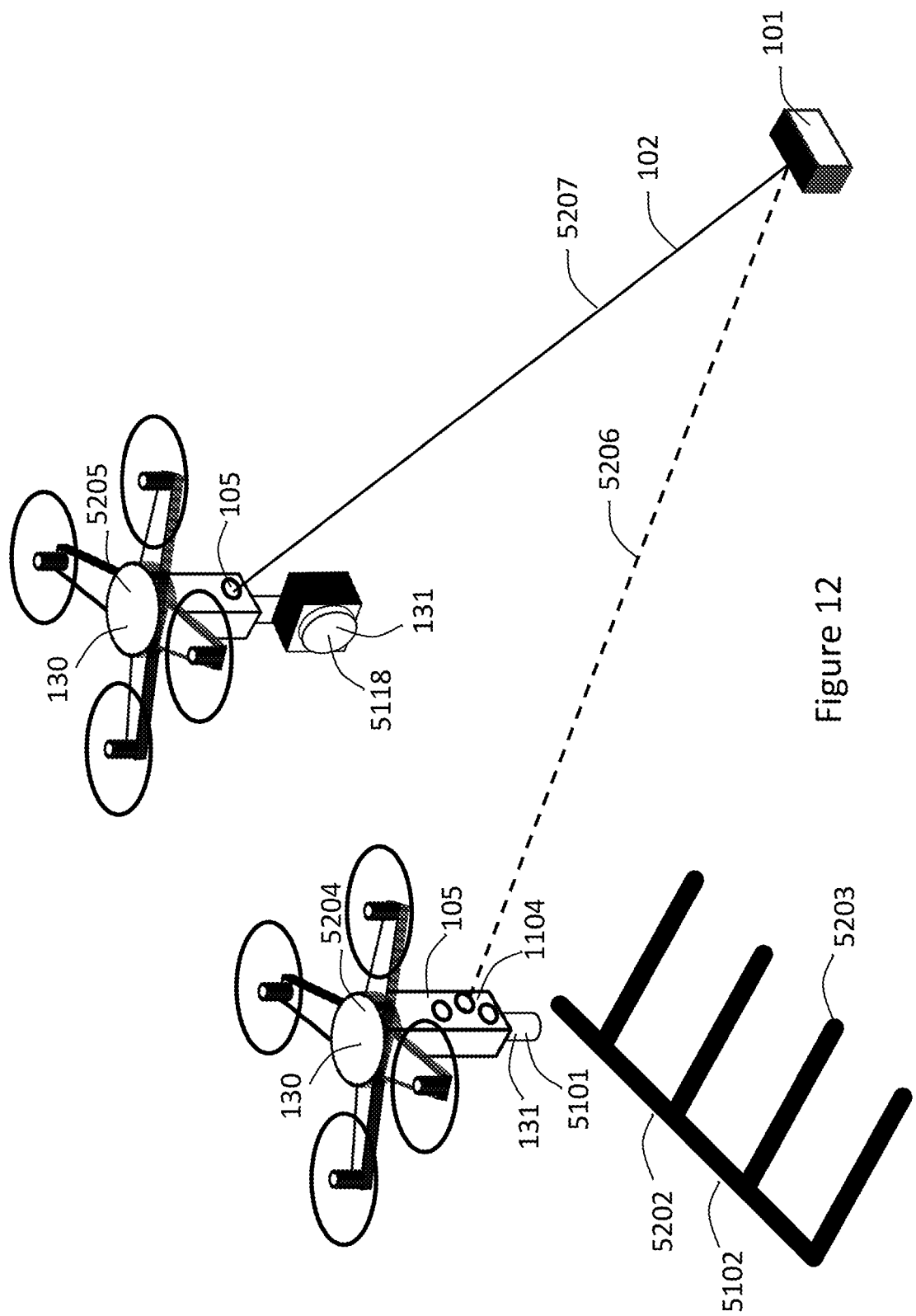
FIG. 12 is a perspective view of an exemplary aerial robot system with two aerial robots and a single measurement source.

FIG. 12 shows an exemplary aerial robot system where a single measurement source 101 measures the position of a first aerial robot 5204 and a second aerial robot 5205 by alternately pointing the emitted measurement beam 102 along a first measurement path 5206 and a second measurement path 5207. An exemplary retroreflector assembly 1104 is shown where said measurement source alternately measures the location of the reflective targets to calculate locations with six degrees of freedom. An exemplary nozzle 5101 delivers a printable material 5102 that is paint 5202 for an application to paint lines for parking spaces 5203. An exemplary camera 5118 captures images.

Figure 13:
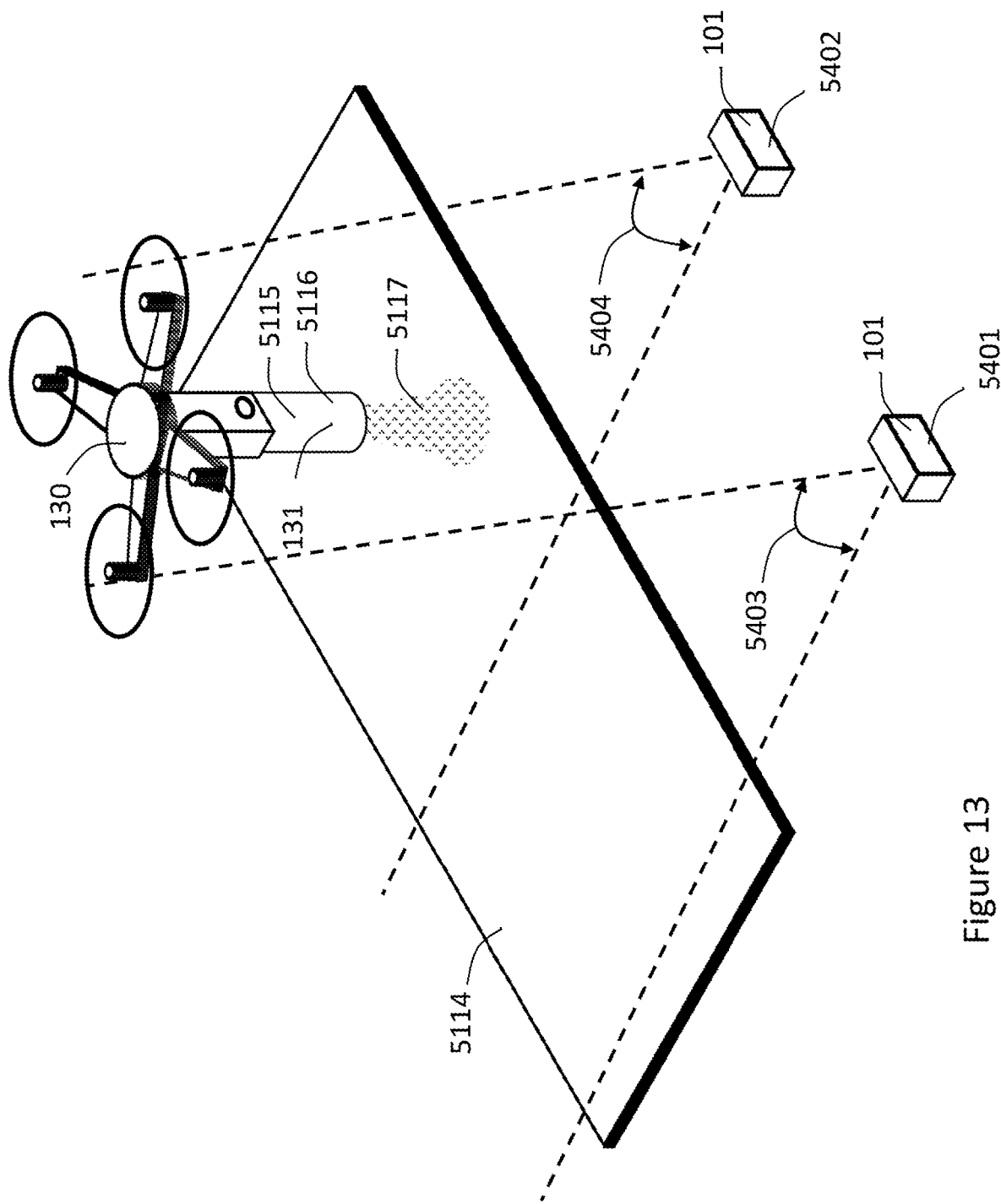
FIG. 13 is a perspective view of an exemplary aerial robot system with two measurement sources and a single aerial robot with a non-contact measurement probe.

FIG. 13 shows an exemplary aerial robot system with multiple measurement sources 101, where a first measurement source 5401 with a first field of view 5403 and a second measurement source 5402 with a second field of view 5404 extends the operating range of a single aerial robot 130. An exemplary non-contact measurement device 5115 end effector 131, is a displacement sensor 5116, that projects a displacement light beam 5117 onto a surface 5114, which is able to measure the distance to and the thickness of said surface.

Figure 14:
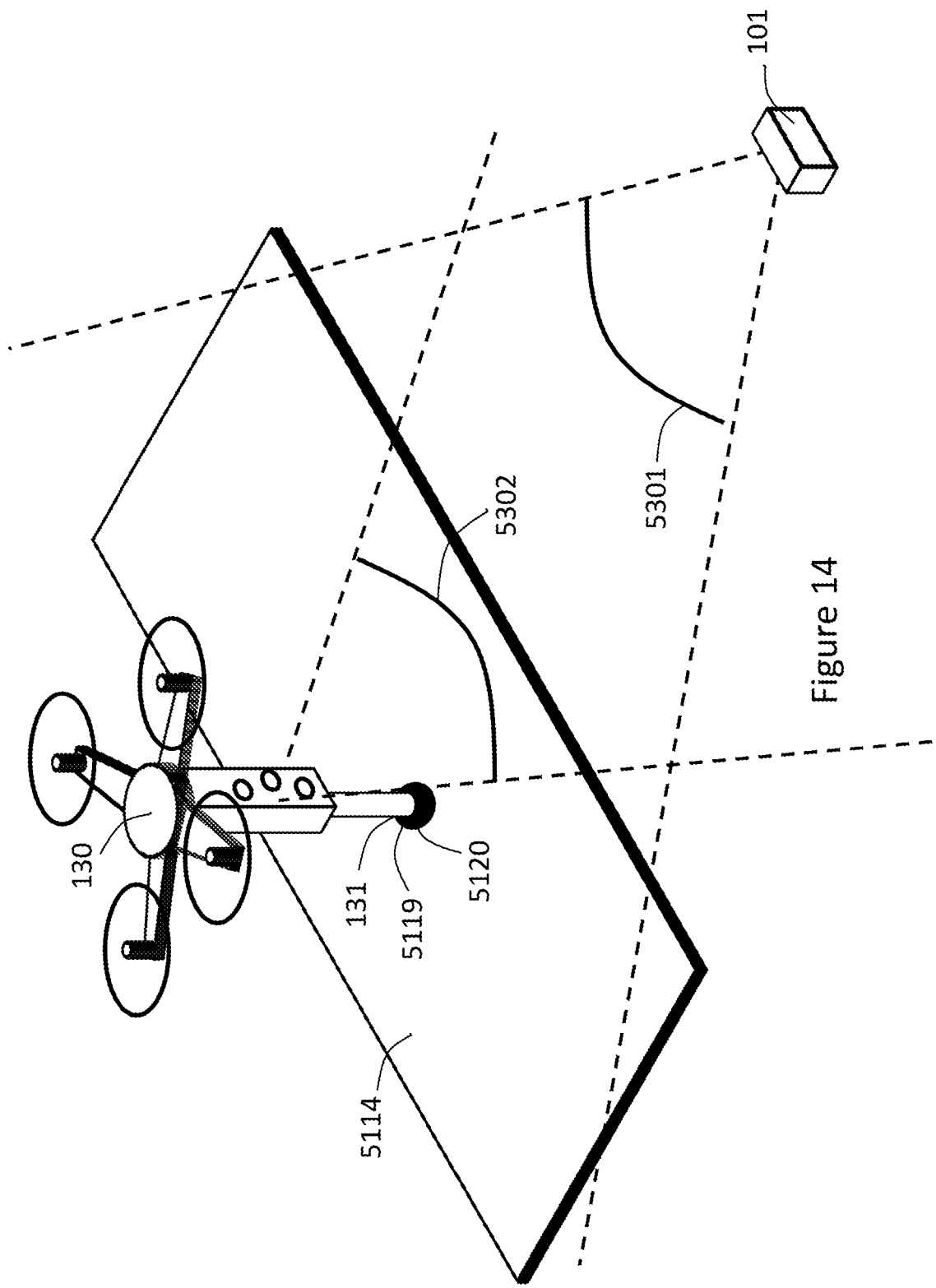
FIG. 14 is a perspective view of an exemplary measurement source with a target camera showing the camera's field of view used in conjunction with a contact measurement device.

FIG. 14 shows an exemplary measurement source 101 with a target camera and the ability to illuminate targets within the field of view 5301 of said measurement source. Targets must be rotated so that said measurement source is within the light acceptance angle of the targets 5302. Exemplary contact measurement device 5119 end effector 131 is a probe tip 5120.

Figure 15:
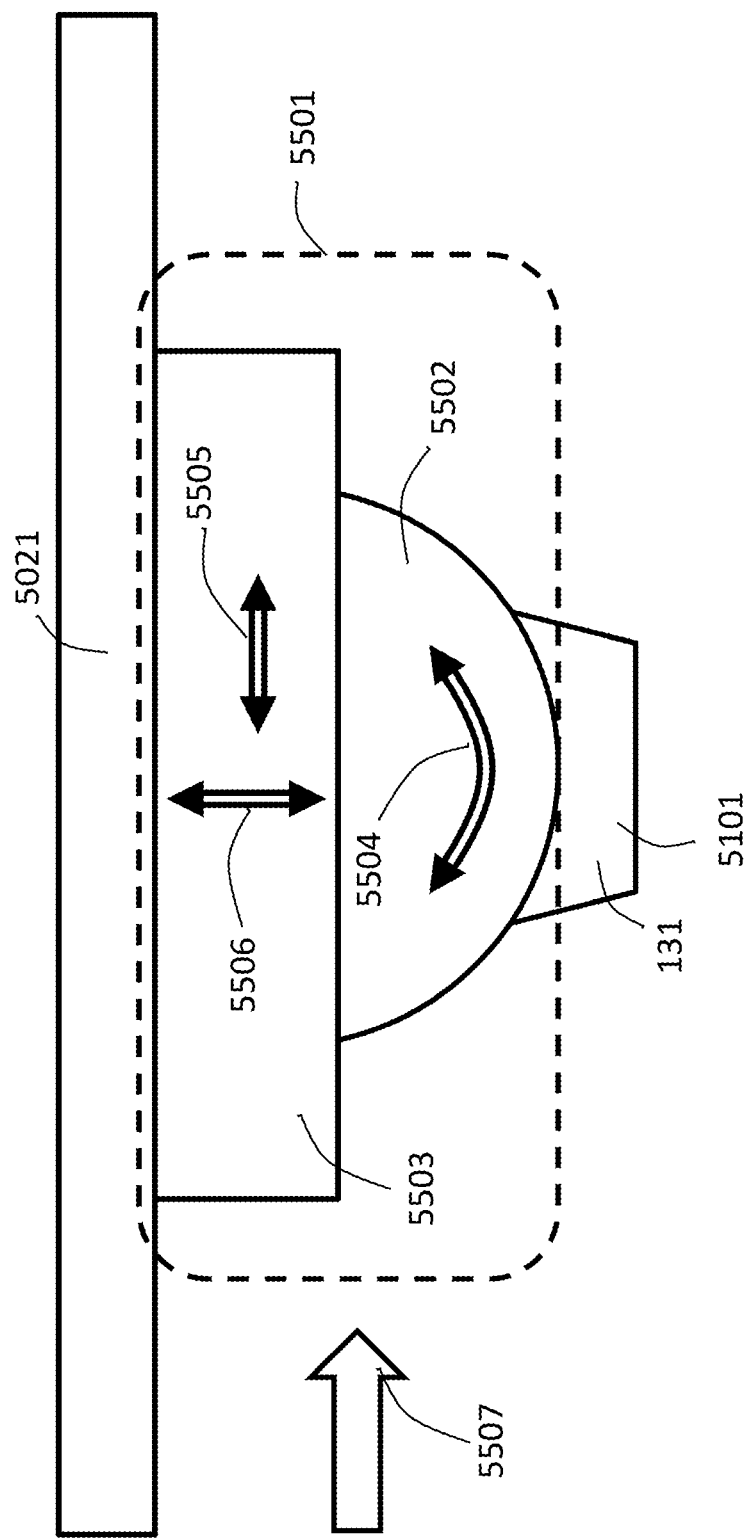
FIG. 15 is a side view an exemplary end effector position mechanism.

FIG. 15 shows an exemplary end effector position mechanism 5501 coupled to the aerial robot mounting structure 5021. Said end effector position mechanism has a translation structure 5503 capable of horizontal motion 5505 and vertical motion 5506, or motion in orthogonal directions with respect to each other. Said end effector position mechanism also has a rotation structure 5502 capable of rotational motion 5504. A nozzle 5101 connected to this structure would have motion in up to five degrees of freedom with respect to said aerial robot mounting structure. The end effector command output 5507 from the aerial robot command processor will cause said nozzle to open and close as well as reposition. This configuration allows for faster correction to positional disturbances than are capable through the aerial robot propellers.

Figure 16:
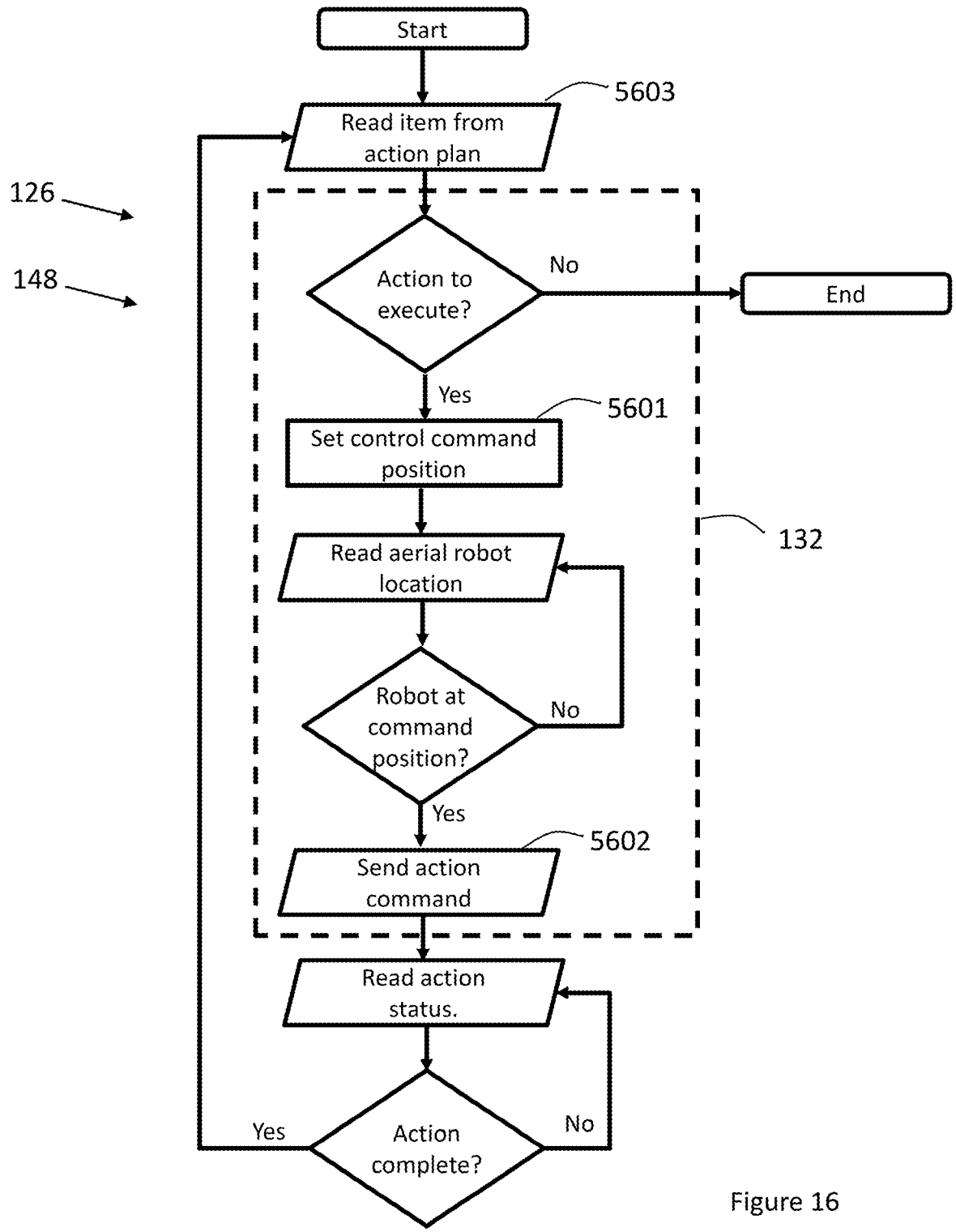
FIG. 16 is an exemplary coordination processor with an action plan.

FIG. 16 shows an exemplary coordination processor 126 with a control algorithm 148 and with an action plan 132 read as an input action plan 5603 with one or more operation locations 5601 where the aerial robot must be positioned and end effector activator instructors 5602 are executed by the end effector.

Figure 17:
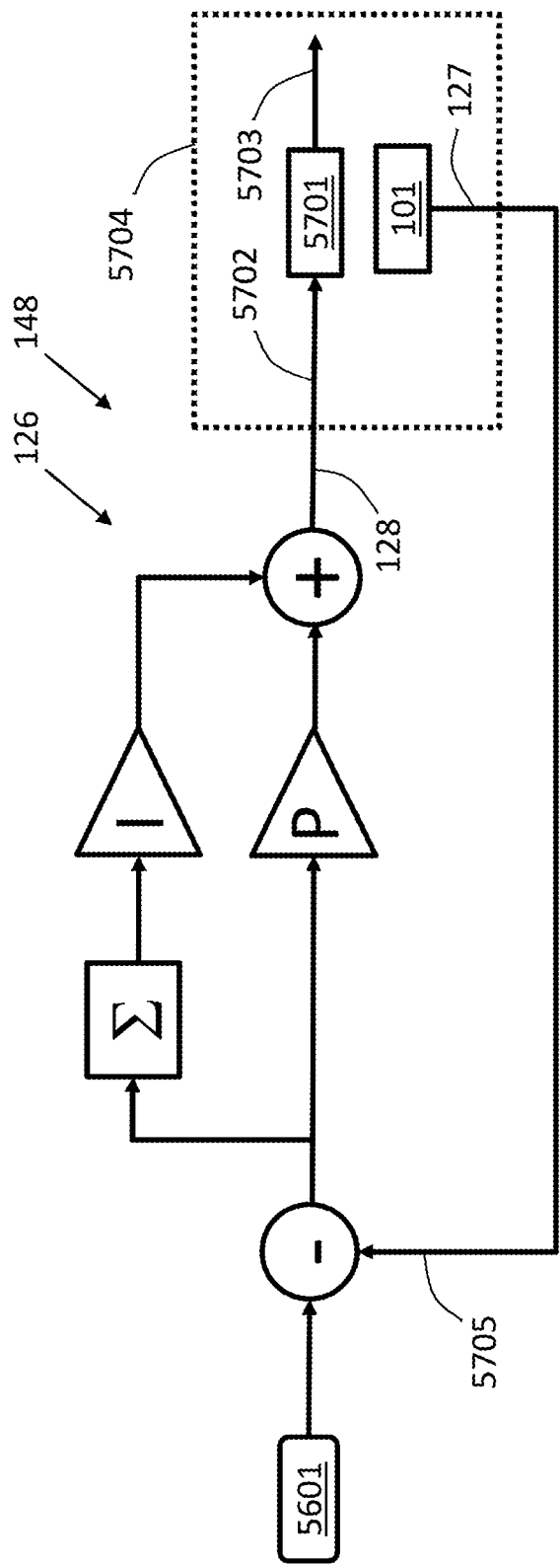
FIG. 17 is an exemplary motion control algorithm.

FIG. 17 shows an exemplary motion control algorithm 148 executed by the coordination processor 126 that interacts with the control system plant 5704. Target data 127 from the measurement source 101 is transformed to the working coordinate system and is used as an input measured position 5705, which is compared to one or more operation locations 5601. A PI calculation generates an action output 128, which is instructs the aerial robot to adjust its position as an aerial robot command input 5702. The aerial robot command processor 5701 generates an output motor command 5703 causing the aerial robot to adjust its position.

Figure 18:
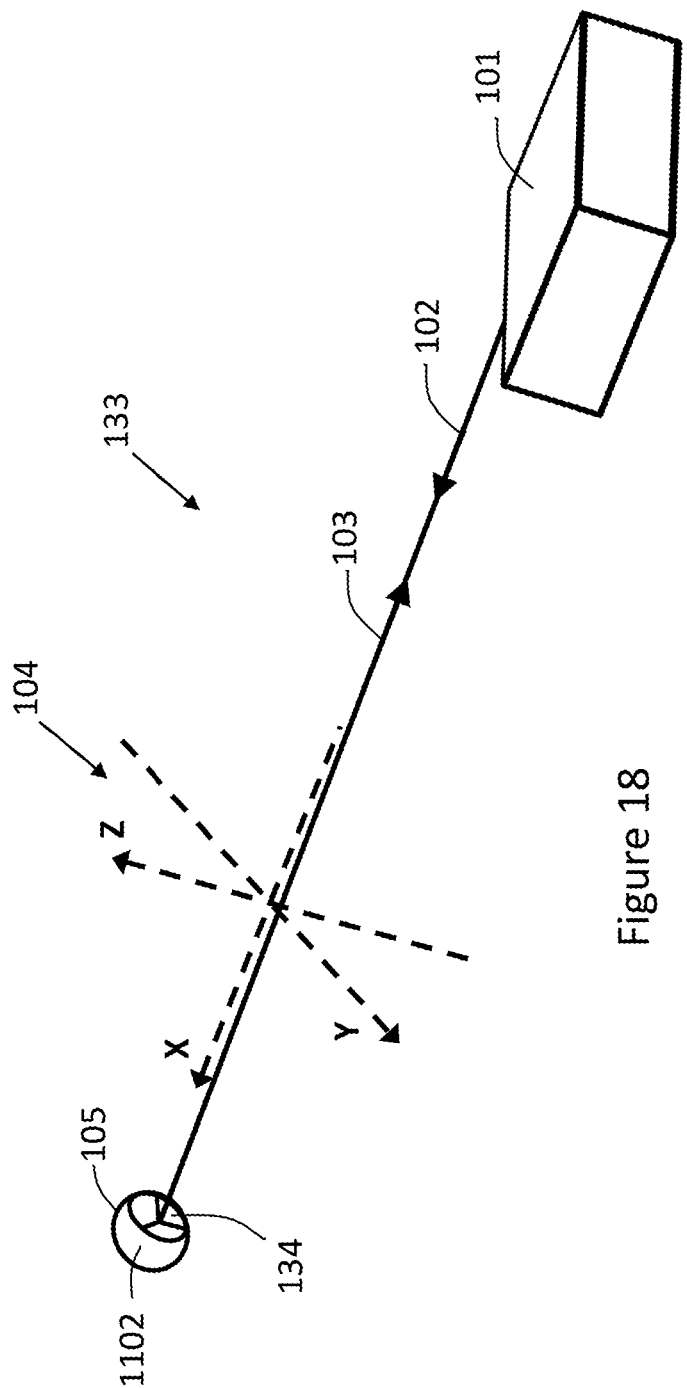
FIG. 18 is an exemplary light beam position measurement system with a single retro reflector.

FIG. 18 shows an exemplary light beam position measurement system 133 with a measurement source 101 that transmits an emitted measurement beam 102 toward a cooperative target 105 that is a single retro reflector 1102 reflecting back a reflected measurement beam 103. Said measurement source is capable of measuring the displacement of said emitted measurement beam from said reflected measurement beam. Said measurement source is capable of redirecting said emitted measurement beam so that it tracks the center of said retro reflector. The tracking angle and measured beam displacement combined with a measured distance to the target produce a target location 134 within the device coordinate system 104 defined by said measurement source, wherein the device coordinate system is a three-dimensional cartesian coordinate system; including three orthogonal axes, X, Y and Z as shown. The target locations in the device coordinate system will typically need to be transformed to locations in a working coordinate system.

Figure 19:
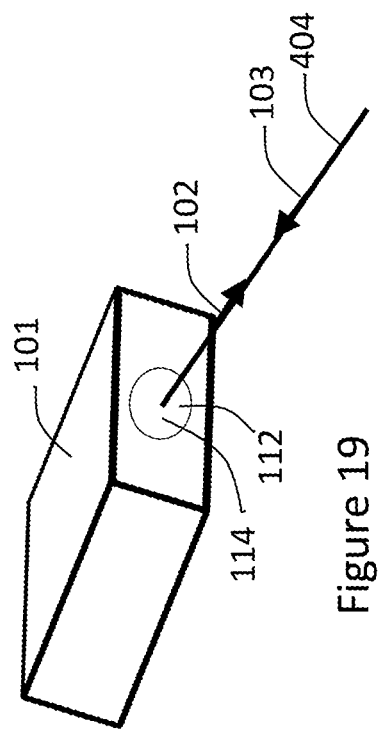
FIG. 19 is a perspective view of an exemplary measurement source.

FIG. 19 shows the front view of exemplary measurement source 101 with a combined measurement source light aperture 112 and source image aperture 114. An exemplary light beam 404 is an emitted measurement beam 102.

Figure 20:
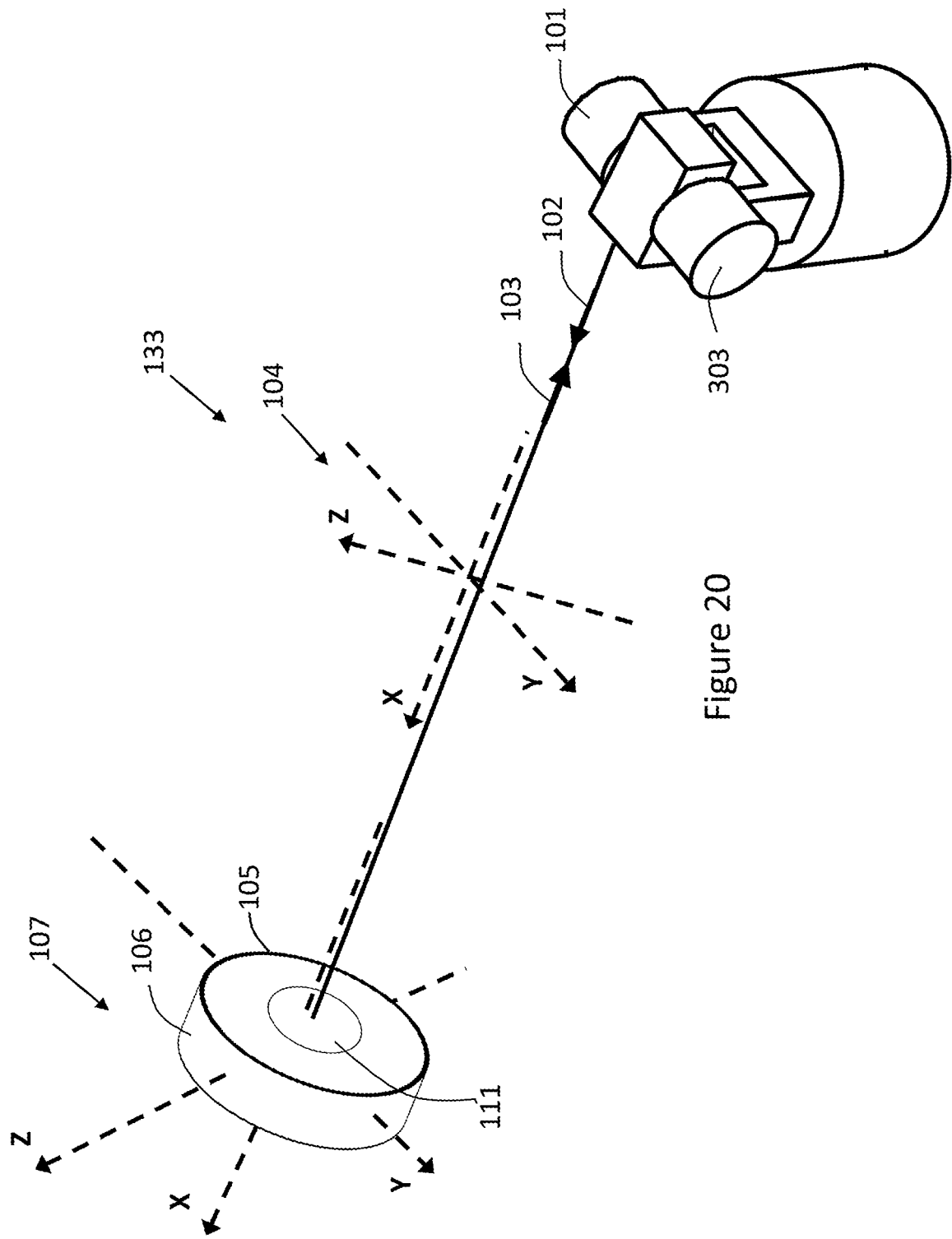
FIG. 20 is a perspective view of an exemplary light beam position measurement system with a laser tracker and a light receiving target.

FIG. 20 shows an exemplary light beam position measurement system 133 with a measurement source 101, which is a laser tracker 303 with a beam steering assembly capable of moving the entire assembly to direct emitted measurement beam 102. An exemplary light receiving target 106 has a target light aperture 111 that is capable of reflecting a reflected measurement beam 103 as well as measuring rotations around the axes of a light receiving target coordinate system 107.

FIG. 21 shows an exemplary retro reflector 1102, which is a cooperative target 105.

FIG. 22 shows an exemplary partially transmissive retro reflector 1105, which is a cooperative target 105 capable of reflecting a portion of emitted measurement beam 102 as a reflected measurement beam 103 and transmitting the remaining portion as a transmitted measurement beam 1106.

FIG. 23 shows an exemplary retro sphere, which is a cooperative target 105.

FIG. 24 shows an exemplary light receiving target 106, which is a cooperative target 105 capable of measuring the orientation of the emitted measurement beam 102 within the target coordinate system 107. The orientation can be represented in a set of translations and rotations. Said light receiving target is also capable of reflecting a reflected measurement beam 103.

FIG. 25 shows an exemplary retro reflector assembly 1104, which is a cooperative target 105 with two or more retroreflectors 1107 mounted to a retro reflector mounting structure 1108. The measurement source measures each retroreflector 1102 and calculates a six degree of freedom orientation of the target coordination system 107.

Figure 26:
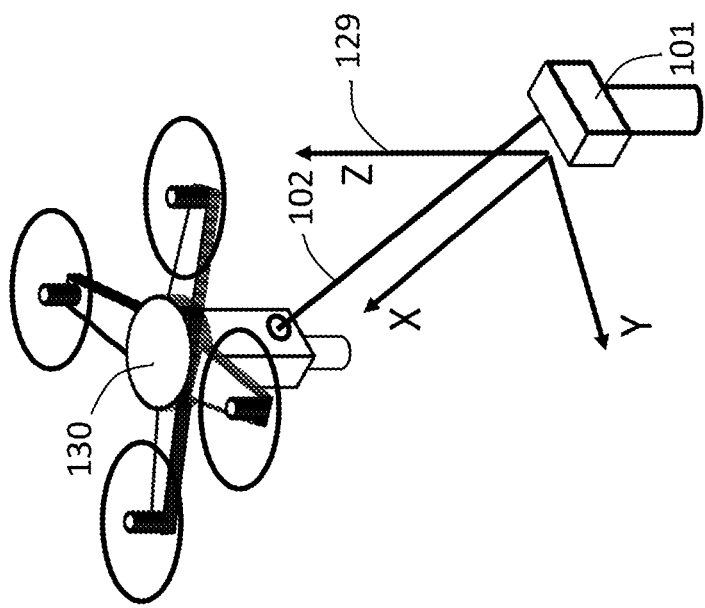
FIG. 26 is a perspective view of an exemplary aerial robot system where the light beam measurement device does not have a beam steering capability.

FIG. 26 shows an exemplary aerial robot system where the measurement source 101 does not have a beam steering capability and therefor is mounted so that emitted measurement beam 102 is parallel to the X-axis of the working coordinate system 129. The robot and measurement devices will have local coordinate systems, which will require transformations to and from locations that are given with respect to the working coordinate system. It is possible to design a system where the different coordinate systems are aligned and therefore the same.

Figure 27:
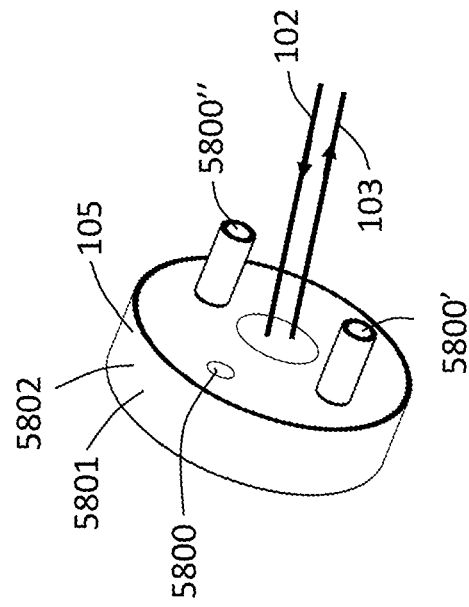
FIG. 27 is a perspective view of an exemplary camera-assisted 6 degree of freedom (DOF) target.

FIG. 27 shows an exemplary cooperative target 105, which is a camera-assisted target 5801, which may be also be referred to as a six degree of freedom (6DOF) target 5802. An emitted measurement beam 102 for which of portion is reflected back by said cooperative target as a reflected measurement beam 103. In addition, there are camera targets 5800, 5800', 5800", that are either reflective or light emitting. A camera combines the image of the camera targets with the position information from the measurement beam to create a six degree of freedom measurement.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

The following references are hereby incorporated by reference herein.

U.S. Pat. No. 4,790,651 Tracking Laser Interferometer, Brown et al.

U.S. Pat. No. 4,714,339 Three and Five Axis Laser Tracking Systems, Lau et al.

U.S. Pat. No. 7,510,142 Aerial Robot, Johnson.

U.S. Pat. No. 7,701,559 Absolute Distance Meter that Measures a Moving Retroreflector, Bridges, et al.

U.S. Pat. No. 8,525,983 Device and Method for Measuring Six Degrees of Freedom, Bridges et al.

U.S. Pat. No. 8,670,114 Device and Method for Measuring Six Degrees of Freedom, Bridges et al.

U.S. Pat. No. 8,803,055 Volumetric Error Compensation System with Laser Tracker and Active Target, Lau et al.

U.S. Pat. No. 9,164,506 Systems and Methods for Target Tracking, Zang

U.S. Pat. No. 9,367,067 Digital Tethering for Tracking with Autonomous Aerial Robot. Gilmore et al.

U.S. Pat. No. 9,958,268 Three-Dimensional Measuring Method and Surveying System, Ohtomo et al.

U.S. Pat. No. 9,976,947 Position Measurement Device, Hoffer

European No. EP3140192A2 Aerial device capable of controlled flight and methods of using such a device, Kovac et al.

Japanese Pat. No. JP67844342 Methods, UAV Control Programs, Unmanned Aerial Vehicle Control Systems.

What is claimed is:

1. An aerial robot position control system comprising:
   a) a light beam position measurement system comprising:
      i) a measurement source that produces an emitted measurement beam that is a light beam; and
      ii) a cooperative target configured within a device coordinate system that has a target location with respect to the measurement source, which is target data;
   b) a coordination processor configured to run a control algorithm comprising:
      i) an input measured position;
      ii) an output motor command; and
      iii) end effector activator instructions;
   c) an aerial robot comprising:
      i) a position driver comprising:
         a propeller; and
         a motor that spins the propeller; and
      ii) an end effector;
   wherein said emitted measurement beam is incident on said cooperative target such that said light beam position measurement system produces said target location within a device coordinate system, which is said target data;
   wherein said target data is provided as an input measured position to said control algorithm to generate said robot positional instructions and said end effector activator instructions;
   wherein said aerial robot receives said output motor command and operates said position driver to set a position of said end effector;
   wherein said aerial robot receives said end effector activator instructions and operates said end effector;
   wherein said cooperative target is coupled with said aerial robot in a fixed positional relationship to said end effector; and
   wherein said measurement source is in a fixed location within said working coordinate system.

2. The aerial robot system of claim 1, wherein said end effector comprises a nozzle configured to deliver a printable material.

3. The aerial robot system of claim 2, wherein said printable material is paint.

4. The aerial robot system of claim 2, wherein said printable material comprises plastic.

5. The aerial robot system of claim 2, wherein said printable material comprises concrete.

6. The aerial robot system of claim 2, wherein said printable material comprises metal.

7. The aerial robot system of claim 1, wherein said end effector is a gripper actuator.

8. The aerial robot system of claim 1, wherein said end effector is a non-contact measurement device.

9. The aerial robot system of claim 1, wherein said end effector is a contact measurement device.

10. The aerial robot system of claim 1, wherein said end effector is a camera.

11. The aerial robot system of claim 1, further comprising an end effector position mechanism configured between the aerial robot and the end effector and configured to move the end effector independently of said aerial robot.

12. An aerial robot position control system comprising:
   a) a light beam position measurement system comprising:
      i) a measurement source that produces an emitted measurement beam that is a light beam; and
      ii) a cooperative target configured within a device coordinate system that has a target location with respect to the measurement source, which is target data;
   b) a coordination processor configured to run a control algorithm comprising:
      i) an input measured position;
      ii) an output motor command; and
      iii) end effector activator instructions;

c) an aerial robot comprising:
  i) a position driver comprising:
    a propeller; and
    a motor that spins the propeller; and
  ii) an end effector;
wherein said emitted measurement beam is incident on said cooperative target such that said light beam position measurement system produces said target location within a device coordinate system, which is said target data;
wherein said target data is provided as an input measured position to said control algorithm to generate said robot positional instructions and said end effector activator instructions;
wherein said aerial robot receives said output motor command and operates said position driver to set a position of said end effector; and
wherein said aerial robot receives said end effector activator instructions and operates said end effector;
wherein said measurement source is coupled with said aerial robot in a fixed positional relationship to said end effector; and
wherein said cooperative target is in a fixed location within said working coordinate system.

13. The aerial robot system of claim 12, wherein said end effector comprises a nozzle configured to deliver a printable material.

14. The aerial robot system of claim 13, wherein said printable material is paint.

15. The aerial robot system of claim 13, wherein said printable material comprises plastic.

16. The aerial robot system of claim 13, wherein said printable material comprises concrete.

17. The aerial robot system of claim 13, wherein said printable material comprises metal.

18. The aerial robot system of claim 12, wherein said end effector is a gripper.

19. The aerial robot system of claim 12, wherein said end effector is a non-contact measurement device.

20. The aerial robot system of claim 12, wherein said end effector is a contact measurement device.

21. The aerial robot system of claim 12, wherein said end effector is a camera.

22. The aerial robot system of claim 12, further comprising an end effector position mechanism configured between the aerial robot and the end effector and configured to move the end effector independently of said aerial robot.

23. The aerial robot system of claim 1 wherein said cooperative reflective target is a retro reflector assembly comprising:
  a) two or more retro reflectors; and
  b) a retroreflector mounting structure
  wherein said two or more retroreflectors are coupled to said retroreflector mounting structure such that their relationship to each other is known;
  where said measurement source measures said two or more retroreflectors such that said target data represents four or more degrees of freedom.

24. The aerial robot system of claim 1 wherein said cooperative reflective target is a light receiving target capable of measuring one or more degrees of freedom such that said target data represents four or more degrees of freedom.

25. The aerial robot system of claim 1, wherein said cooperative reflective target is a 6 degree of freedom target.

26. The aerial robot system of claim 1, wherein said a measurement source is a laser tracker.

27. The aerial robot system of claim 12 wherein said cooperative reflective target is a retro reflector assembly comprising:
  c) two or more retro reflectors; and
  d) a retroreflector mounting structure
  wherein said two or more retroreflectors are coupled to said retroreflector mounting structure such that their relationship to each other is known;
  where said measurement source measures said two or more retroreflectors such that said target data represents four or more degrees of freedom.

28. The aerial robot system of claim 12 wherein said cooperative reflective target is a light receiving target capable of measuring one or more degrees of freedom such that said target data represents four or more degrees of freedom.

29. The aerial robot system of claim 12, wherein said cooperative reflective target is a 6 degree of freedom target.

30. The aerial robot system of claim 12, wherein said a measurement source is a laser tracker.

* * * * *